United States Patent [19]

Goodman

[11] 4,253,710
[45] Mar. 3, 1981

[54] HIGH TEMPERATURE SEALING SYSTEM FOR A ROTARY ROCK BIT

[75] Inventor: Lee Goodman, Santa Rosa, Calif.

[73] Assignee: Dresser Industries, Inc., Dallas, Tex.

[21] Appl. No.: 83,124

[22] Filed: Oct. 9, 1979

Related U.S. Application Data

[63] Continuation of Ser. No. 954,710, Oct. 25, 1978, abandoned.

[51] Int. Cl.³ .................... F16C 33/80; E21B 9/08; E21B 9/35
[52] U.S. Cl. .................... 308/8.2; 308/36.1; 308/187; 175/372; 277/56
[58] Field of Search .................... 308/8.2, 36.1, 36.3, 308/187, 187.1, 187.2; 277/56, 57, 96.1; 175/371, 372

[56] References Cited

U.S. PATENT DOCUMENTS

| 3,680,873 | 8/1972 | Garner | 308/8.2 |
| 3,719,241 | 3/1973 | Bell | 175/372 |
| 3,944,306 | 3/1976 | Neilson | 308/36.1 |
| 4,073,548 | 2/1978 | Walters | 308/8.2 |

FOREIGN PATENT DOCUMENTS

| 2007141 | 9/1971 | Fed. Rep. of Germany | 277/56 |
| 946007 | 5/1949 | France | 308/187.1 |
| 1260080 | 3/1961 | France | 308/8.2 |
| 128449 | 6/1950 | Sweden | 277/56 |
| 350923 | 9/1972 | U.S.S.R. | 175/372 |

Primary Examiner—Richard R. Stearns
Attorney, Agent, or Firm—Fred A. Winans; Eddie E. Scott

[57] ABSTRACT

A sealing system acts as a barrier to the drilling fluid, pulverized cuttings and other materials in the borehole preventing the materials from entering the bearing area of a rotary rock bit and retains lubricant inside the bearing area of the bit. At least one bearing pin extends from the body of the bit and a rolling cutter is mounted on the bearing pin. A seal assembly is located in the mouth of the cutter between the cutter and the bearing pin. The seal assembly includes a non-rotating element affixed to the bearing pin and a rotating element affixed to the rolling cutter. The rotating and non-rotating elements have intermeshing labyrinthine projections that may be constructed of heat resistant materials.

1 Claim, 2 Drawing Figures

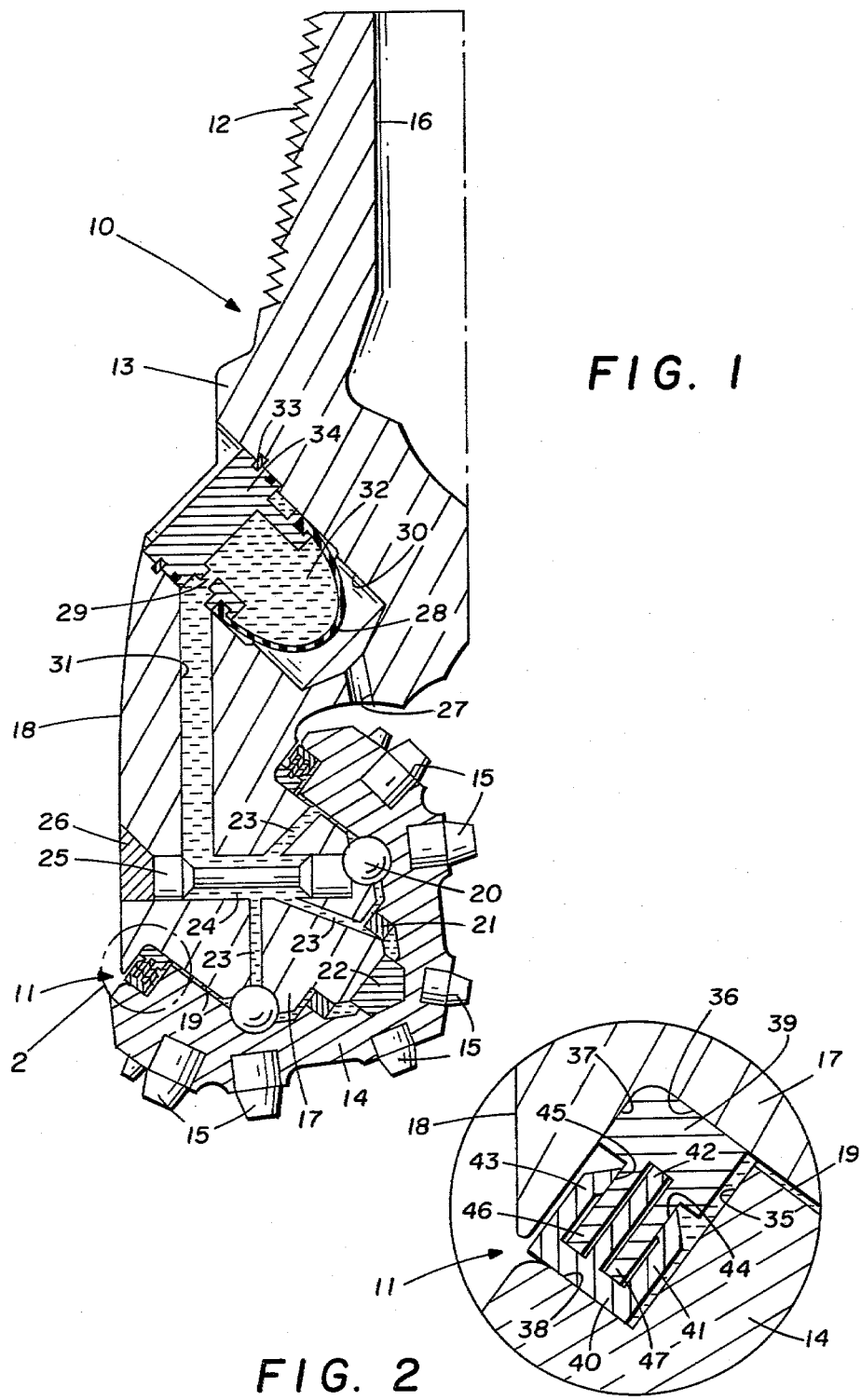

HIGH TEMPERATURE SEALING SYSTEM FOR A ROTARY ROCK BIT

This is a continuation of application Ser. No. 954,710, filed Oct. 25, 1978, and now abandoned.

FIELD OF THE INVENTION

The present invention relates to the art of earth boring and, more particularly, to a rotary rock bit with a seal assembly for sealing the bearings of the bit from materials in the borehole and retaining lubricant within the bearing area. The present invention is especially adapted for use with rock bits popularly known as three cone rotary rock bits; however, its use is not restricted thereto, and the present invention can be used in other types of rotary rock bits.

BACKGROUND OF THE INVENTION

A three cone rotary rock bit consists of a main bit body adapted to be connected to a rotary drill string. The bit includes three individual rotatable cone cutters mounted on three individual bearing pins extending from the main bit body. Bearing systems are provided between the cone cutters and the bearing pins to promote rotation of the cutters and means are provided on the outer surface of the cone cutters for disintegrating the earth formations as the bit and the cutters rotate. A sufficient supply of uncontaminated lubricant must be maintainined proximate the bearing systems throughout the lifetime of the bit. Various forms of seals have been provided between the cone cutters and the bearing pins upon which they are mounted to retain lubricant and prevent contamination; however, the need for new sealing systems is as acute today as any time in the history of rock drilling.

A three cone rotary rock bit must operate under very severe conditions, and the size and geometry of the bit is restricted by the operating characteristics. At the same time, the economics of petroleum production demand a longer lifetime and improved performance from the bit. In attempting to provide an improved bit, new and improved materials have been developed for the cutting structure of the cone cutters. They have provided a longer useful lifetime for the cone cutters. This has resulted in the bearing systems of the bit being often the first to fail during the drilling operation. Consequently, a need exists for new and improved bearing systems to extend the useful lifetime of the bit and to allow development of other elements that interact with the sealing and bearing systems. In attempting to improve the bearing systems, various seal systems have been provided to maintain the bearing area free of harmful materials and retain lubricant. In attempting to provide new sealing systems, great care must be taken that the overall capacity of the bearing systems is not reduced. The prior seal assemblies generally included materials that would not withstand high temperature environments.

DESCRIPTION OF PRIOR ART

In U.S. Pat. No. 3,397,928 to E. M. Galle, patented Aug. 20, 1968, a seal means for drill bit bearings is shown. The seal means includes a shaft rigidly secured to a drill bit body with a bearing surface formed thereon. A cutter element is rotatably mounted to said shaft and includes a bearing surface thereon that opposes and engages the bearing surface on the shaft. A resilient packing ring is positioned in a groove in one of the surfaces. The packing ring, the groove and an opposing surface are sized such that upon assembly of the cutter element upon the shaft the cross sectional thickness of the packing ring is compressed by not less than substantially 10% of this thickness prior to assembly of the cutter element upon the shaft.

Other drill bit sealing systems are shown in U.S. Pat. No. 1,884,965 to Baggett, U.S. Pat. No. 2,797,067 to Fisher, U.S. Pat. No. 3,075,781 to Atkinson, U.S. Pat. No. 3,096,835 to Neilson, U.S. Pat. No. 3,151,691 to Goodwin, U.S. Pat. No. 3,303,898 to Bercaru, U.S. Pat. No. 3,529,840 to Durham and U.S. Pat. No. 3,862,762 to Millsap.

SUMMARY OF THE INVENTION

The present invention provides a sealing assembly for a rotary rock bit that acts as a barrier to the drilling fluid, pulverized cuttings and other materials in the borehole to prevent the materials from entering the bearing area of the bit and retains lubricant within said bearing area. A bit body is provided. A bearing pin extends from the bit body. A rolling cone cutter is rotatably mounted on the bearing pin. Bearing means are located between the rolling cutter and the bearing pin upon which it is mounted. The rolling cutter has a cutter mouth. A seal assembly is positioned around the bearing pin within the cutter mouth. The seal assembly includes a non-rotating element affixed to the bearing pin and a rotating element affixed to the rolling cone cutter. The rotating and non-rotating elements have intermeshing labyrinthine projections. The seal assembly is primarily a labyrinth seal, but also incorporates features of lip and face seals. The seal assembly is especially useful in high temperature service where standard elastomeric seals such as O-rings are quickly destroyed. The above and other features and advantages of the present invention will become apparent upon consideration of the following detailed description of the invention when taken in conjunction with the accompanying drawings.

BRIEF DESCRIPTION OF THE DRAWINGS

FIG. 1 is an illustration of an earth boring bit constructed in accordance with the present invention.

FIG. 2 is an enlarged view illustrating the seal assembly of the bit shown in FIG. 1.

DETAILED DESCRIPTION OF THE INVENTION

Referring now to FIG. 1, a sectional view of one arm 18 of a three cone rotary rock bit 10 is shown. It is to be understood that the structures of the other two arms are substantially identical to the arm 18. A cutter 14 is rotatably positioned on the journal portion or bearing pin 17 of the arm 18 and adapted to disintegrate the earth formations as the bit 10 is rotated. The bearing pin 17 projects from the cutter receiving surface of the arm 18. The cutting structure 15 on the surface of cutter 14 contacts and disintegrates the formations in a manner that is well known in the art. The cutting structure 15 is shown in the form of tungsten carbide inserts. However, it is to be understood that other cutting structures such as steel teeth may be used as the cutting structure on the cone cutter 14.

The body 13 of the bit 10 includes an upper threaded portion 12 that allows the bit 10 to be connected to the lower end of a rotary drill string (not shown). The bit 10 also includes a central passageway 16 extending along the central axis of the bit to allow drilling fluid to enter from the upper section of the drill string (not shown) immediately above and pass downward to the bottom of the well bore to flush cuttings and drilling debris from the well bore.

A plurality of bearing systems are located in the bearing area between the cutter 14 and the bearing pin 17. The bearing systems in the bearing area include an outer friction bearing 19, a series of ball bearings 20, an inner friction bearing 21, and a thrust button 22. A seal assembly is positioned between the cutter 14 and the bearing pin 17. The seal assembly 11 acts to retain lubricant in the bearing area around the bearing systems and prevents materials in the well bore from entering the bearing area. Passageways 23 and 24 are provided to allow lubricant to be transmitted to the bearing systems. The passageway 24, as shown, also allows the balls that make up the ball bearing system 20 to be inserted into position after the cone cutter 14 is placed on the bearing pin 18. The series of ball bearings 20 serves to lock the cone cutter 14 on bearing pin 18. After the balls are in place, a plug 25 is inserted into the passageway 24 and welded therein by weld 26. Plug 25 has a reduced diameter throughout the major portion of its length to allow lubricant to be transmitted to the bearing area. The additional passageways 23 extend from passageway 24 to the bearing area to insure a sufficient supply of lubricant to bearings 19, 20, 21 and 22.

A bore 30 extends into the body 13 from the surface of the bit body. A passage 31 extends from the bore 30 to the passageway 24. A lubricant reservoir 32 is located between a flexible diaphragm 28 and a reservoir cap 34. An O-ring seal prevents borehole fluid from by-passing the upper portion of the reservoir cap 34 and lubricant within the lubricant reservoir 32 from escaping into the borehole. A retaining ring 33 holds reservoir cap 34 in position in bore 30. The flexible diaphragm 28 prevents lubricant in the lubricant reservoir 32 from escaping into the bore 30 and fluid in the borehole that has entered bore 30 through passage 27 from entering the lubricant reservoir 32. Lubricant within the lubricant reservoir 32 is channeled into the passage 31 through opening 29 and is directed to the bearings.

Referring now to FIG. 2, an enlarged view of a portion of the arm 18, the cone 14 and the seal assembly 11 is shown. The seal assembly 11 is positioned between a surface 36 on the bearing pin 17 and a surface 38 on the cone cutter 14. The seal assembly 11 is also positioned between a receiving surface 37 on the arm 18 and a surface 35 on the cone cutter 14. The seal assembly 11 provides a sealing system that acts as a barrier to the drilling fluid, pulverized cuttings and other materials in the borehole to prevent the materials from entering the bearing area of the bit and retains lubricant within said bearing area. The seal assembly 11 includes a non-rotating inner member 39 affixed to the bearing pin 17 and an outer rotating member 40 affixed to the cone cutter 14. Labyrinth sealing is provided by the path between the intermeshing radial elements 41, 42, 43, 46 and 47. Lip and face sealing is also provided. The radial elements include means such as Belleville type springs to urge the members into sealing engagement. The members 39 and 40 may be made of materials such as rubber or plastic or metals or combinations of said materials.

The non-rotating member 39 is affixed to the bearing pin 17 by means such as an interference fit. As shown in FIG. 2, the non-rotating member 39 is press-fit on the bearing pin 17. A pair of annular projections 46 and 47 extend radially outward from the main body portion of the non-rotating member 39. The rotating member 40 is affixed to the rolling cone cutter 14 by means such as an interference fit. As shown in FIG. 2, the rotating member 40 is press-fit into the groove formed by the surfaces 35 and 38 in the rolling cone cutter 14. It is to be understood that the non-rotating member 39 and rotating member 40 may be affixed to the bearing pin 17 and cone cutter 17 respectively by bonding or welding or other affixing procedures. The rotating member 40 includes three annular projections 41, 42 and 43 extending radially inward from the body of the rotating member 40. The radial projections 41, 42, 43, 46 and 47 intermesh and provide a labyrinth. Face or lip seal areas 44 and 45 are provided between the projections 41 and 47 and 43 and 46 respectively. The projections 41 and 43 urge the face seal areas 44 and 45 into engagement with the projections 47 and 46 respectively.

The structural details of an earth boring bit 10 constructed in accordance with the present invention having been described, the operation of the bit 10 will now be considered with reference to FIGS. 1 and 2. The lubrication system of the bit 10 is filled with a suitable lubricant. The area within the flexible diaphragm 28 provides a reservoir of lubricant. The flexible diaphragm 28 seals the lower end of the lubricant reservoir and is held in place by the cap 34. The bit 10 will be lowered into a well bore until the cutter 14 contacts the earth formations at the bottom of the borehole. The hydrostatic pressure of fluid in the well bore is substantial. The lubrication system of the bit 10 allows the pressure of fluid in the well bore to be transmitted to the lubricant reservoir through passage 27 to the lubricant through diaphragm 28. This allows the pressure of lubricant inside the bit and fluid in the borehole to be equalized as the bit 10 is moved through the borehole. Lubricant from the lubricant reservoir can migrate through passages 31, 24 and 23 and be transmitted to the bearing systems. The bit 10 is rotated and thrust downward, thrusting the cutter 14 against the earth formations. Continued rotation with the weight of the drill string applying a thrust force to the bit 10 causes the cutters to disintegrate the formations and form the desired borehole. Lubricant within the bit 10 will be retained by the seal assembly 11.

The embodiments of the invention in which an exclusive property or privilege is claimed are defined as follows:

1. An earth boring bit for operation in a fluid filled borehole, comprising:

a bit body;

a bearing pin extending from said bit body;

a rolling cone cutter rotatably mounted on said bearing pin with a lubricant in a lubricant area between said bearing pin and rolling cone cutter, said rolling cone cutter having a cone mouth;

a seal assembly positioned around said bearing pin within said cone mouth and located between said bearing pin and said rolling cone cutter for retaining lubricant in said lubricant area and preventing fluid in said borehole from entering said lubricant area, said seal assembly including a non-rotating element affixed to said bearing pin, said non-rotating element having a pair of non-rotating elements projecting radially toward the cone mouth; and a rotating element affixed to said rolling cone cutter at said cone mouth, said rotating element having three integral elements axially spaced from one another and projecting radially toward said pin, with the axially outer two of said three elements having a free end spring biased into sealing contact with the opposite sides of said non-rotating elements extending between said rotating elements and axially spaced therefrom and said non-rotating projecting radial elements each having a free end terminating closely adjacent said rotating element to provide a labyrinthine seal having limited face seal areas on two of said three rotating projecting radial elements contacting said non-rotating projecting radial elements to provide face seals that maintain said lubricant in said lubricant area and prevent fluid in said borehole from entering said lubricant area.

* * * * *